March 13, 1956    K. L. VOLZ ET AL    2,737,832
CLAMPING MECHANISM
Filed March 10, 1950    3 Sheets-Sheet 3
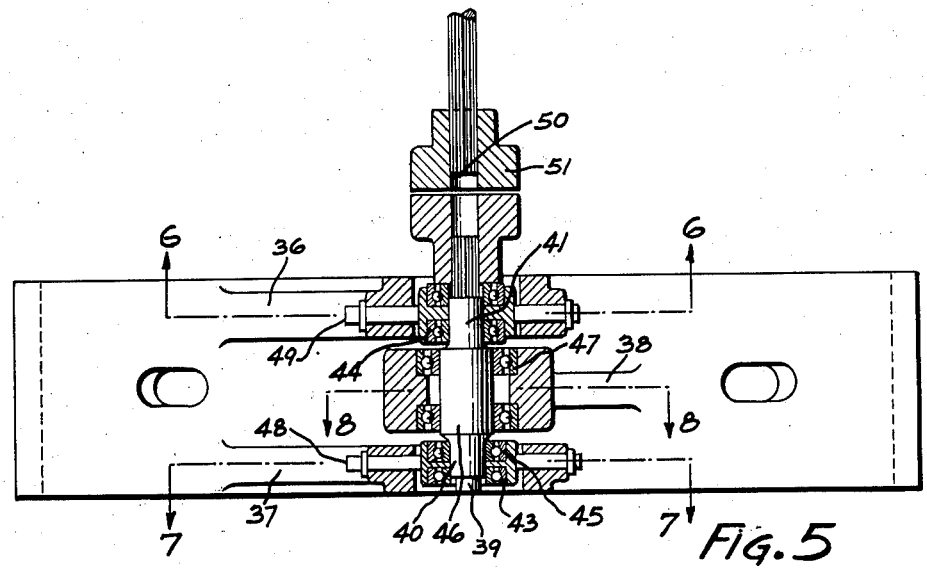
Fig. 5
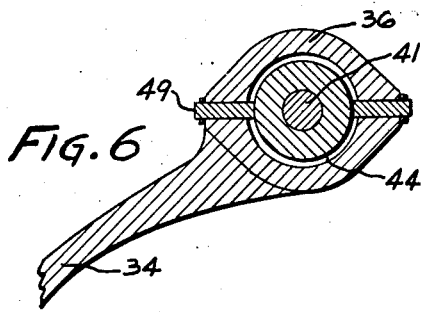
Fig. 6
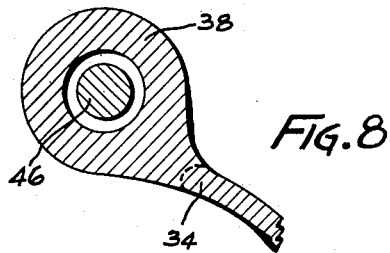
Fig. 8
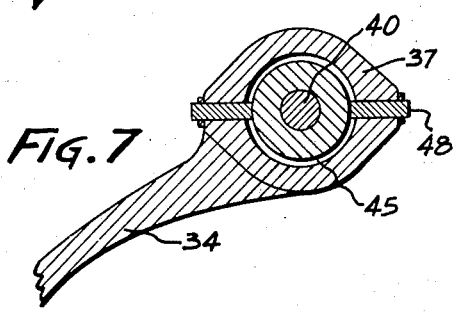
Fig. 7
| APPLIED THRUST AT "T" | 2000 LB. | 3000 LB. | 4000 LB. | 5000 LB. |
|---|---|---|---|---|
| USING CLAMPING BOLTS | .013 | .022 | .032 | .045 |
| SLOTTED COLUMN | .012 | .018 | .028 | .038 |
Fig. 9
INVENTORS
KENNETH L. VOLZ
MILES L. WEIDIG
BY: Edward J. Utz
THEIR ATTORNEY

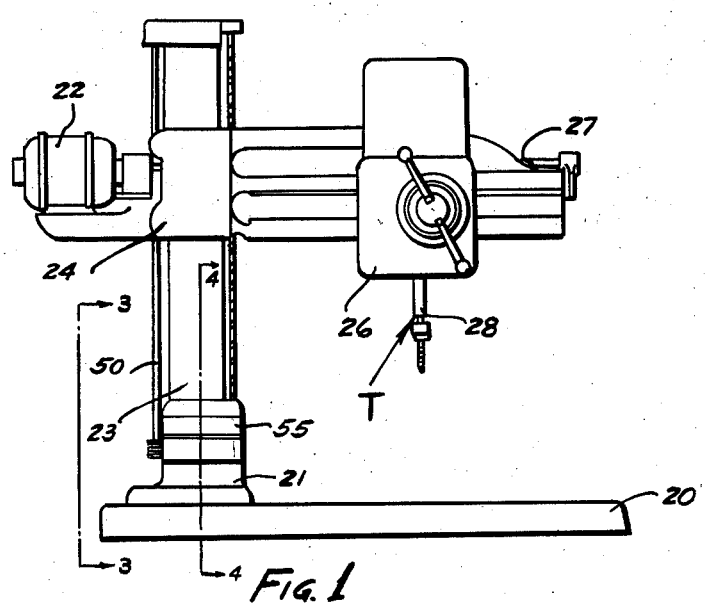
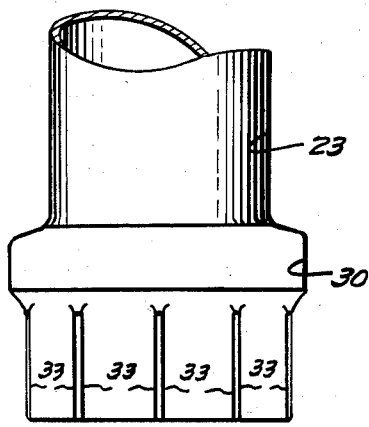
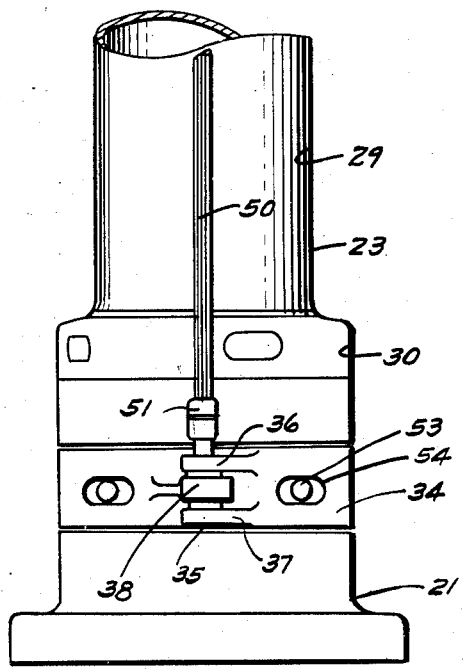

United States Patent Office 2,737,832
Patented Mar. 13, 1956

2,737,832

CLAMPING MECHANISM

Kenneth L. Volz, Mount Healthy, and Miles L. Weidig, Cincinnati, Ohio, assignors to Carlton Machine Tool Company, Cincinnati, Ohio, a corporation of Ohio Application March 10, 1950, Serial No. 148,958

6 Claims. (Cl. 77—28)

Our invention relates to drilling machine tools of the radial arm type, and more particularly to the clamping mechanism for use in clamping the column of the machine tool to the base or stump.

In drilling machine tools of the radial arm type, a base or stump is provided upon which a column is fitted. The column is adapted to have a radial arm vertically slidable thereon and a tool carrying member or head is translatably carried upon the arm. The translatable head member is adapted to be clamped upon the arm, the arm is adapted to be clamped to the column and the column is adapted to be clamped to the base.

Heretofore, considerable difficulty has arisen because of the inefficiency of clamping mechanism designed to clamp the column to the base or stump. It has been observed that because of said inefficient clamping that the column after clamping pressure is applied is displaced in two directions. This displacement is translated to the arm and of course to the head member which carries the tool so that the tool, such as for example a drill bit, reamer or boring bar, is displaced in two directions. This results in definite inaccuracies in operation. It has also been observed, that prior to our invention, the error on account of displacement is proportionately greater as the translatable member carrying the tool is moved from the column. That is, as the distance between the vertical axis of the tool and the vertical axis of the column is increased, the errors of displacement are increased proportionately.

The errors which are produced by the old methods of clamping the column to the base are such that with the translatable member at its greatest distance from the vertical axis of the column the tool member is displaced laterally up to .010, as for example, on a drilling machine having a five foot arm and a seventeen inch diameter column, and the tool member is displaced vertically up to .020.

With our invention we have reduced the lateral displacement to zero and have confined the vertical displacement to zero.

Accordingly therefore:

The principal object of our invention is to provide a clamping mechanism for clamping the column of a radial drill to the base or stump in which the vertical displacement of the tool carried by a translatable member is reduced to zero.

Another object of our invention is to provide a clamping mechanism for clamping one circular element to another, for example, the column of a radial drill to the base or stump, in which there is no possibility for the clamping forces to cause rotative displacement from the desired fixed positions.

Another object of our invention is to provide a clamping mechanism having a column provided with split portions which increases the clamping efficiency by use of a plurality of simultaneous clamping movements.

Another object of our invention is to provide a clamping mechanism which is operable on the column of a radial drill which will maintain the column in a rigid position when clamped, relative to the stump.

Another object of our invention is to provide a clamping mechanism for a radial drill in which the clamping efficiency is increased by reason of clamping action between two finished surfaces.

Another object of our invention is to provide a clamping ring which is fixed to the slotted portion of a column and is split and provided with ears in which a shaft is rotatable to move the ring into clamping engagement with the column.

Another object of our invention is to provide a split clamping ring having a finished annular surface which is adapted to engage the finished surface of the column which is provided with slots having edges parallel to the vertical axis of the column.

Other objects and objects relating to details of construction and economies of operation will definitely appear from the detailed description to follow. In one instance, we have accomplished the objects of our invention by the devices and means set forth in the following specification. Our invention is clearly defined and pointed out in the appended claims. Structures useful in carrying out our invention are illustrated in the accompanying drawings forming a part of this specification, in which:

Figure 1 is a view of a drilling machine of the type having a column rotatable upon a base, an arm vertically slidable upon the column and a translatable head member carrying a tool on the arm.

Figure 2 is a view of the lower portion of the column of our invention showing the slots which have edges parallel to the vertical axis of the column.

Figure 3 is a view taken looking in the direction of the arrows at the ends of the line in Figure 1.

Figure 5 is a view of the clamping ring with the mechanism for urging the clamping ring into clamping engagement.

Figure 6 is a partial, detail sectional view taken along the line 6—6 of Figure 5.

Figure 7 is a partial, detail sectional view taken along the line 7—7 of Figure 5.

Figure 8 is a partial, detail sectional view taken along the line 8—8 of Figure 5.

Figure 9 is a chart showing the deflections under various vertical thrusts and compares the old style clamping devices with that of our invention.

In the drawings the same reference numerals refer to the same parts throughout the several views and the sectional views are taken looking in the direction of the arrows at the ends of the section lines.

Figure 4:
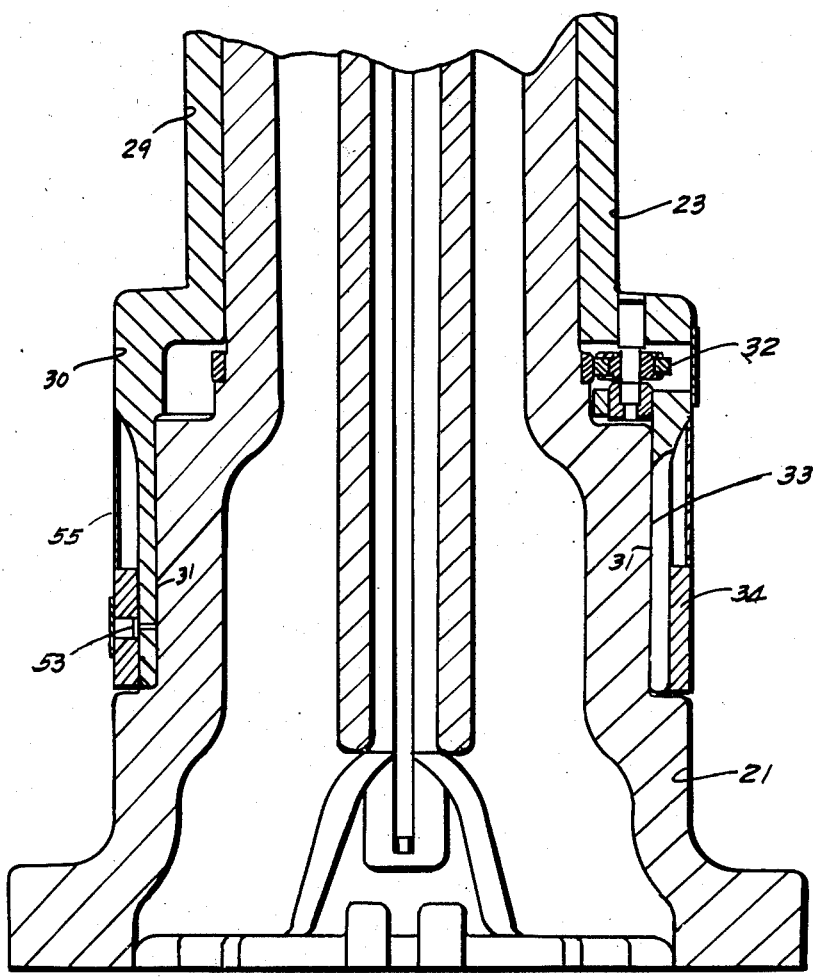
Figure 4 is a partial, detail section taken along the line 4—4 of Figure 1.

In general our invention comprises a column clamping mechanism which is useful in clamping a column of a drilling machine of the radial arm type to a base or stump. The column in our invention is formed with an upper portion upon which the arm is vertically slidable and a lower portion of somewhat greater diameter than the upper portion of the column. This lower portion is provided with spaced vertical slots which have their edges substantially parallel with the vertical axis of the column.

The column which slips over the base or stump is rotatable upon the base or stump and has a bearing at the portion having the spaced slots. It is the purpose of our invention to confine the column against rotation by compressing the slotted portion of the column with the base. We provide a clamping ring which is split vertically along its peripheral surface at one point so that it may be drawn tightly into engagement with the slotted portion of the column. The split ring is compressed by use of an eccentric shaft rotated by any suitable drive on the radial drill. We provide ears on the ring at the split ends thereof, one ear at the top and one ear at the bottom of the ring at one end of the ring. Another ear is provided at the other end of the ring. Each of the ears is provided with an annular opening which has an axis which is common to all of said ears. The ears are attached to the ring at the split portion and form a part of the ends of the ring.

A bearing is mounted in each of the ears and in the upper and lower ears is surrounded by a bearing casing. The bearing has journaled therein a shaft having an eccentric portion revolvable concentrically in the upper and lower ears. Spaced between the upper and lower ears is another portion of the shaft mounted in a bearing journaled in said ear. The eccentric shaft is coupled to a drive shaft which is powered by suitable mechanism carried by the arm and/or column of the drilling machine.

Referring to the numbered parts of the drawings, the invention is disclosed as embodied in a radial drill comprising a bed 20, an upright column consisting of a post 21 fixed to the bed and a cylindrical sleeve 23 rotatably journaled thereon. Upon the sleeve or column 23, the girdle 24 is slidingly fitted for vertical movement and has a radial arm 25 extending therefrom. The arm 25 supports on its rearward extension an electric motor 22 for supplying rotatable force to a translatable tool carrying head member 26. Power is supplied to the tool carrying head member 26 by means of a shaft 27 journaled lengthwise of the arm and mounted rearwardly thereof, which serves to transmit motion from the motor armature to the translatable tool head 26 for rotating the tool spindle 28 journaled therein.

For maintaining the head in any desired position suitable means is provided for clamping the head to the arm. To maintain the arm in any desired position suitable means is provided for clamping the arm to the column.

The column 23 is provided with a portion 29 upon which the arm 25 is slidable. The column is provided also with a lower portion 30 having a diameter greater than that of portion 29 and which is adapted to bear on its inner circumference on the post 21 at 31. The column is rotatable upon anti-friction bearings 32 carried by said post 21.

Referring now to Figure 2, a detail of a portion of the column is shown with vertical slots 33 cut therein. In the example illustrated eight slots are provided.

A clamping ring 34 surrounds the slotted portion of the column and is split at 35. On one end of the ring 34, a pair of ears 36 and 37 are made integral with the ring and a third ear is integral with the other end of the ring.

An eccentric shaft 39, referring to Figure 5, is mounted in the ears in said ring and is provided with eccentric portions 40 and 41 which are mounted in casings 44 and 45. Another portion of the shaft has a concentric portion 46 which is journaled in bearings 47 mounted in ear 38. The casings 44 and 45 are cammed by means of the eccentric motion imparted thereto against a pair of shoes 48 and 49.

The ring 34 is fixed to the column by means of a screw, not shown, diametrically opposite the split portion of the ring. The ring is carried on studs 53 having threaded ends in the column 23 and an upper portion in the elongated slots 54.

A second pair of shoes 48a and 49a are provided and permit the adjustment of the tension on the casings 44 and 45. The shoes 48a and 49a bear against their respective casing members to urge the ring to unclamped position, when the shaft 39 is rotated to unclamped position.

A shaft 50 is carried at the side of the column and is coupled at 51 to the eccentric shaft 39. This shaft 50 supplies rotative force to the shaft which operates to pull the ears 36 and 37 circumferentially in one direction and the ear 38 circumferentially in another direction by means of the cam movement of casings 44 and 45 in the bores of the ears 36 and 37.

The clamping force which is imparted to the column by the ring holds the column in rigid position relative to the post, thereby the errors of displacement caused by previous column clamping mechanisms are alleviated.

The cover member 55 is fixed to the column and in addition to providing a surface pleasing to the eye covers the upper portion of the vertical slots.

Without further analysis, the foregoing detailed description will so fully and clearly disclose the invention, that others may readily adapt it for other variations, by retaining one or more of the features which constitute essential characteristics of the generic or specific aspects of this invention, and therefore we claim our invention broadly as indicated by the appended claims.

Having thus described our invention, what we claim as new and useful and desired to secure by Letters Patent, is:

1. A clamp mechanism for a radial drill comprising a column, a base to which said column is adapted to be clamped, said column having an upper portion and a lower portion of greater diameter than said upper portion, the lower portion having a plurality of slots therein, the edges of which are parallel to the vertical axis of said column and a power actuated ring for compressing said lower portion to said column to clamp said column to said base.

2. A clamp mechanism for a radial drill comprising a column, a base to which said column is adapted to be clamped, said column having a slotted portion surrounding a portion of said base, said slots having edges parallel to the vertical axis of said column, a ring surrounding said slots, said ring being split and having a pair of ears extending from one of its ends, and another ear extending from the other of its ends, an eccentric shaft, bearing mountings carried in said ears in which said shaft is journaled, said eccentric shaft having an upper and a lower portion journaled in said pair of ears, said portions of said shaft concentric with each other and eccentric to the axis of rotation of said shaft, and a portion of said shaft journaled in the other ear concentric with the axis of rotation of said shaft whereby a pair of said ears is moved in a direction opposite the other ear to move said ring against said column to clamp said column to said base when said shaft is rotated.

3. A radial drill comprising the combination of a column and a base to which said column is adapted to be clamped, an arm vertically slidable on said column and adapted to be clamped thereto, a head translatable on said arm and adapted to be clamped thereto, said column having a plurality of slots therein, said slots having edges parallel to the vertical axis of said column, a ring surrounding said slots, and mechanism controlled from said head for moving portions of said ring in opposed relation to clamp said column to said base when said head and arm are clamped whereby said head is held in a fixed position.

4. A radial drill comprising the combination of a column, a base to which said column is adapted to be clamped, an arm vertically slidable on said column adapted to be clamped thereto, a head translatable on said arm adapted to be clamped thereto, means for clamping said head to said arm, means for clamping said arm to said column; said column having an upper portion and a lower portion of greater diameter, the lower portion having a plurality of slots therein, the edges of which are parallel to the vertical axis of said column, a split ring surrounding said slotted portion of the column, power actuated means for urging said ring into clamping relation with said column, whereby said column is clamped to said base to hold said head and arm in fixed position when said first and second named means are effective.

5. A radial drill comprising the combination of a column, a base to which said column is adapted to be clamped, an arm vertically slidable on said column adapted to be clamped thereto, means for clamping said arm to said column, a head translatable on said arm adapted to be clamped thereto, means for clamping said head to said arm, said column having a slotted portion surrounding a portion of said base, said slots having edges parallel to the vertical axis of said column, a split ring surrounding said slots, an eccentric shaft journaled in bearings mounted in ears in said ring, said ears extending from opposite sides of said ring, said shaft adapted when rotated to move said ears in opposite directions, a pair of shoes extending from said rings against which said eccentric shaft rotates to clamp said column to said base to hold said head in fixed position when said arm is clamped to said column and said head is clamped to said arm.

6. A radial drill comprising the combination of a column, a base to which said column is adapted to be clamped, an arm vertically slidable on said column adapted to be clamped thereto, means for clamping said arm to said column, a head translatable on said arm adapted to be clamped thereto, means for clamping said head to said arm, said column having a slotted portion surrounding a portion of said base, said slots having edges parallel to the vertical axis of said column, a ring surrounding said slots and secured at one end to said column, said ring being split and having a plurality of ears at its ends, an eccentric shaft, bearing mountings carried in said ears in which said shaft is journaled, said eccentric shaft having an upper portion and a lower portion concentric with each other and eccentric to the axis of rotation of said shaft and a portion of said shaft journaled in one of said ears concentric with the axis of rotation of said shaft whereby at least one of said ears is moved in a direction opposite one other of said ears to move said ring against said column to clamp said column to said base, to hold said head and arm in fixed position when said first and second named means are effective for clamping.

References Cited in the file of this patent

UNITED STATES PATENTS

| 1,070,815 | Klausmeyer | Aug. 19, 1913 |
| 2,233,340 | Carlton | Feb. 25, 1941 |

FOREIGN PATENTS

| 10,833 | Great Britain | June 25, 1891 |